US012498956B2

(12) United States Patent
Shen et al.

(10) Patent No.: US 12,498,956 B2
(45) Date of Patent: *Dec. 16, 2025

(54) METHODS AND SYSTEMS FOR INSTANTIATING AND TRANSPARENTLY MIGRATING EXECUTING CONTAINERIZED PROCESSES

(71) Applicant: Exotanium, Inc., Ithaca, NY (US)

(72) Inventors: Zhiming Shen, Ithaca, NY (US); Hakim Weatherspoon, Ithaca, NY (US); Robbert Van Renesse, Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,938

(22) Filed: Jan. 11, 2024

(65) Prior Publication Data

US 2024/0143378 A1    May 2, 2024

Related U.S. Application Data

(63) Continuation of application No. 17/403,326, filed on Aug. 16, 2021, now Pat. No. 11,915,031.

(Continued)

(51) Int. Cl.
*G06F 9/455* (2018.01)
*G06F 8/61* (2018.01)
(Continued)

(52) U.S. Cl.
CPC ............ *G06F 9/45558* (2013.01); *G06F 8/63* (2013.01); *G06F 9/4887* (2013.01); *G06F 9/545* (2013.01);
(Continued)

(58) Field of Classification Search
CPC ...... G06F 9/45558; G06F 8/63; G06F 9/4887; G06F 2009/45562; G06F 2009/45595
See application file for complete search history.

(56) References Cited

U.S. PATENT DOCUMENTS

| | | | |
|---|---|---|---|
| 6,725,221 B2 | 4/2004 | Murakami | |
| 7,512,769 B1 | 3/2009 | Lowell | |

(Continued)

FOREIGN PATENT DOCUMENTS

| | | |
|---|---|---|
| CN | 115943365 A | 4/2023 |
| IL | 300200 | 3/2023 |
| WO | 2022040082 A1 | 2/2022 |

OTHER PUBLICATIONS

Cloud Management Platform Market Size , Overview and scope, Market players, Market Research, Growth During to 2017-2024, Press Release MarketWatch News Department, May 7, 2019. (Accessed Feb. 17, 2020, at https://www.marketwatch.com/press-release/cloud-mana/\ players-market-research-growth-during-to-2017--2024-2020-05-07?mod=mw_quote_news.

(Continued)

*Primary Examiner* — Wissam Rashid
(74) *Attorney, Agent, or Firm* — Blueshift IP, LLC; Cynthia M. Gilbert

(57) ABSTRACT

A method for instantiating and transparently migrating executing containerized processes includes receiving, by a container engine executing on a first machine, an instruction to instantiate a container image on the first machine. The container engine transmits, to a modified container runtime process, executing on the first machine, the instruction to instantiate the container image on the first machine. The modified container runtime process generates, on the first machine, a shim process representing the instantiated container image. The shim process forwards the instruction to an agent executing on a second machine, via a proxy connected to the agent via a network connection. The agent directs instantiation of the container image as a containerized process. A scheduler component executing on the first machine determines to migrate the containerized process to a third machine. The scheduler component directs migration (Continued)

of the containerized process to the third machine, during execution of the containerized process.

16 Claims, 8 Drawing Sheets

Related U.S. Application Data

(60) Provisional application No. 63/211,200, filed on Jun. 16, 2021, provisional application No. 63/066,566, filed on Aug. 17, 2020.

(51) Int. Cl.
  *G06F 9/48* (2006.01)
  *G06F 9/54* (2006.01)
(52) U.S. Cl.
  CPC .............. *G06F 2009/45562* (2013.01); *G06F 2009/45595* (2013.01)

(56) References Cited

U.S. PATENT DOCUMENTS

| | | | |
|---|---|---|---|
| 10,091,072 | B2 | 10/2018 | Cropper |
| 11,567,794 | B1 | 1/2023 | Emelyanov |
| 11,886,926 | B1 | 1/2024 | Gadalin |
| 12,099,884 | B2 | 9/2024 | An |
| 2007/0180436 | A1 | 8/2007 | Travostino |
| 2015/0220358 | A1 | 8/2015 | Ponsford |
| 2016/0164762 | A1 | 6/2016 | Reque |
| 2016/0217050 | A1 | 7/2016 | Grimm |
| 2017/0098071 | A1 | 4/2017 | Stopel |
| 2018/0053001 | A1 | 2/2018 | Folco |
| 2018/0074748 | A1 | 3/2018 | Makin |
| 2019/0050272 | A1 | 2/2019 | Liu |
| 2019/0250946 | A1 | 8/2019 | Parameshwaran |
| 2019/0278624 | A1 | 9/2019 | Bade |
| 2019/0347127 | A1* | 11/2019 | Coady .................. G06F 8/63 |
| 2020/0034167 | A1 | 1/2020 | Parthasarathy |
| 2020/0065021 | A1 | 2/2020 | Mayatskikh |
| 2020/0097323 | A1 | 3/2020 | Nider |
| 2020/0117743 | A1 | 4/2020 | Shilimkar |
| 2020/0192689 | A1 | 6/2020 | Smith, IV |
| 2020/0310853 | A1 | 10/2020 | Featonby |
| 2020/0356397 | A1 | 11/2020 | Kumatagi |
| 2021/0026707 | A1 | 1/2021 | Rosenberg |
| 2021/0109775 | A1 | 4/2021 | Zhiming |
| 2021/0318900 | A1 | 10/2021 | Gopalan |
| 2022/0027778 | A1 | 1/2022 | Kochura |
| 2022/0050705 | A1 | 2/2022 | Shen |
| 2022/0084157 | A1 | 3/2022 | Wang |
| 2023/0105439 | A1 | 4/2023 | Shen |
| 2023/0236861 | A1 | 7/2023 | Sahu |
| 2023/0393879 | A1 | 12/2023 | Olmsted-Thompson |
| 2024/0143448 | A1 | 5/2024 | Kim |
| 2024/0272942 | A1 | 8/2024 | Peng |
| 2024/0370291 | A1 | 11/2024 | Liu |
| 2025/0021369 | A1 | 1/2025 | Parekh |
| 2025/0258720 | A1 | 8/2025 | Shen |
| 2025/0307017 | A1 | 10/2025 | Zhiming |

OTHER PUBLICATIONS

Gartner Forecasts Worldwide Public Cloud Revenue to Grow 17.3 Percent in 2019, Press Release, Stamford, Connecticut, USA, Sep. 12, 2018 (Accessed Feb. 17, 2020, at https://www.gartner.com/en/newsroom/press-releases/2018-09-12-gartner-forecasts-worldwide-public-cloud-revenue-to-grow-17-percent-in-2019.).

Christine Parizo "Managing multiple clouds requires careful choice, architecture planning," TechRepublic, Nov. 2016. Accessed Feb. 17, 2020, at https://www.techrepublic.com/article/managing-multiple-clouds-requires-carefulchoice-architectu re-planning/).

Dan Williams et al., "The Xen-Blanket: Virtualize Once, Run Everywhere," EuroSys '12: Proceedings of the 7th ACM European conference on Computer Systems, Bern, Switzerland, Apr. 2012, pp. 113-126.

Daniel Hein, "Cloud Users Are Wasting 35% of Their Cloud Spending," Cloud Computing News 2019. (Accessed Feb. 17, 2020, at https://solutionsreview.com/cloud-platforms/cloud-users-are-wasting-35-of-their-cloud-spending/.).

International Search Report and Written Opinion mailed Dec. 9, 2021, in international patent application No. PCT/US2021/046133, 6 pages.

Jay Chapel, "4 Types of Idle Cloud Resources That Are Wasting Your Money," Technology & Innovation: Cloud Computing, Jun. 26, 2018. (Accessed Feb. 17, 2020, at https://www.business2community.com/cloud-computing/4-types-of-idle-cloud-resources-that-arewasting-your-money-02082628).

Jay Chapel, "Cloud Waste To Hit Over $14 Billion in 2019," DevOps, 2019. (Accessed Feb. 17, 2020, at https://devops.com/cloud-waste-to-hit-over-14-billion-in-2019/).

Larry Dignan, "Top cloud providers in 2020: AWS, Microsoft Azure, and Google Cloud, hybrid, SaaS players," Part of a ZDNet Special Feature: Managing the Multicloud, 2020,48 pages. (Accessed Feb. 17, 2020, at https://www.zdnetcom/article/the-top-cloud-providers-of-2020-aws-microsoft-azure-google-cloud-hybrid-saas/).

Laurence Goasduff, "Why Organizations Choose a Multicloud Strategy," Gartner.com, May 2019. at https://www.gartner.com/smarterwithgartner/why-organizations-choose-a-multicloud-strategy/.

Mary Shacklett, "Enterprise leader's guide to building a successful multicloud strategy," Part of a ZDNet Special Feature: Managing the Multicloud, Jul. 1, 2019. (Accessed Feb. 17, 2020, at https://www.zdnet.com/article/enterprise-leaders-guide-to-building-a-successful-multicloudstrategy/).

Michele Mazzucco et al., "Achieving Performance and Availability Guarantees with Spot Instances," 2011 IEEE International Conference on High Performance Computing and Communications, Banff, AB, Canada, Sep. 2-4, 2011, 8 pages.

Navraj Chohan et al., "See Spot Run: Using Spot Instances for MapReduce Workflows," HotCloud'10: Proceedings of the 2nd USENIX conference on Hot topics in cloud computing, Jun. 2010, 7 pages.

Notice of Allowance issued in App. No. IL300200, dated Oct. 24, 2023, 3 pages.

Office Action (Notice of Allowance and Fees Due (PTOL-85)) dated Oct. 12, 2023 for U.S. Appl. No. 17/403,326 (pp. 1-8).

Prateek Sharma et al., "SpotCheck: Designing a Derivative IaaS Cloud on the Spot Market," EuroSys '15 (2015) 15 pages.

Qin Jia et al., "Smart Spot Instances for the Supercloud," CrossCloud '16: Proceedings of the 3rd Workshop on CrossCloud Infrastructures & Platforms, London, United Kingdom, Apr. 2016, Article No. 5, pp. 1-6.

Rightscale 2019 State of the Cloud Report from Flexera: As Cloud use grows, organizations focus on Cloud costs and governance, Press Release by Flexera, 2019, 50 pages. Available online at << https://resources.flexera.com/web/media/documents/rightscale-2019-state-of-the-cloud-report-from-flexera.pdfB.

Ron Miller, VMware acquires Cloud Health Technologies for multi-cloud management, TechCrunch, Aug. 27, 2018. (Accessed Feb. 26, 2020, at https://techcrunch.com/2018/08/27/vmware-acquires-cloudhealth-technologies-for-Multi-cloud-management).

Sangho Yi et al., "Reducing Costs of Spot Instances via Checkpointing in the Amazon Elastic Compute Cloud," 2010 IEEE 3rd International Conference on Cloud Computing, Miami, FL, Jul. 5-10, 2010, pp. 236-243.

Supreeth Shastri et al., "Cloud Index Tracking: Enabling Predictable Costs in Cloud Spot Markets," SoCC '18: Proceedings of the ACM Symposium on Cloud Computing, Carlsbad, CA, USA, Oct. 11-13, 2018, pp. 451-463. Available online at: <<https://doi.org/10.1145/3267809.3267821>>.

(56) References Cited

OTHER PUBLICATIONS

Supreeth Shastri et al., "HotSpot: Automated Server Hopping in Cloud Spot Markets," SoCC '17: Proceedings of the 2017 Symposium on Cloud Computing, Santa Clara, California, US, Sep. 2017, pp. 493-505.

Supreeth Subramanya et al., "SpotOn: A Batch Computing Service for the Spot Market," SoCC '15: Proceedings of the Sixth ACM Symposium on Cloud Computing, Kohala Coast, Hawaii, USA, Aug. 2015 pp. 329-341.

Taifi, "Banking on Decoupling: Budget-driven Sustainability for HPC Applications on Auction-based Clouds," Acm Sigops Operating Systems Review, vol. 47, No. 2, 2012, pp. 41-50.

Timothy Wood et al., "Black-box and Gray-box Strategies for Virtual Machine Migration," NSDI '07,4th Usenix Symposium on Networked Systems Design & Implementation, Apr. 11-13, 2007, Cambridge, Massachusetts, USA, 14 )ages.

Zhiming Shen et al., "Follow the Sun through the Clouds: Application Migration for Geographically Shifting Workloads," 30CC '16: Proceedings of the Seventh ACM Symposium on Cloud Computing, Oct. 2016, pp. 141-154.

Zhiming Shen et al., "X-Containers: Breaking Down Barriers to Improve Performance and Isolation of Cloud-Native Containers," ASPLOS '19: Proceedings of the Twenty-Fourth International Conference on Architectural Support for Programming Languages and Operating Systems, Providence, Rhode Island, USA, Apr. 13-17, 2019, pp. 121-135.

Office Action (Non-Final Rejection) dated Feb. 4, 2025 for U.S. Appl. No. 18/079,392 (pp. 1-12).

International Search Report and Written Opinion issued in App. No. PCT/US2025/15209, dated May 23, 2025, 10 pages.

Notice of Allowance dated May 8, 2025 for U.S. Appl. No. 19/049,229 (pp. 1-18).

Notice of Allowance dated May 28, 2025 for U.S. Appl. No. 19/049,229 (pp. 1-13).

Andreas Fischer et al: "Wide-Area Virtual Machine Migration as Resilience Mechanism", Reliable Distributed Systems Workshops (SRDSW), 2011 30th IEEE Symposium on, IEEE, Oct. 4, 2011 (Oct. 4, 2011), pp. 72-77, XP032022027, DOI: 10.1109/SRDSW. 2011.16 ISBN: 978-1-4577-1624-9.

Extended European Search Report issued in App. No. EP21858893, dated Sep. 25, 2024, 13 pages.

Tay, Y. C. et al: "A Performance Comparison of Containers and Virtual Machines in Workload Migration Context", 2017 IEEE 37th International Conference on Distributed Computing Systems Workshops (ICDCSW), IEEE, Jun. 5, 2017 (Jun. 5, 2017), pp. 61-66, XP033122904, DOI: 10.1109/ICDCSW.2017.44 [retrieved on Jul. 13, 2017].

Office Action (Notice of Allowance and Fees Due (PTOL-85)) dated Aug. 28, 2025 for U.S. Appl. No. 18/079,392 (pp. 1-9).

Office Action (Notice of Allowance and Fees Due (PTOL-85)) dated Sep. 15, 2025 for U.S. Appl. No. 19/049,229 (pp. 1-7).

\* cited by examiner

METHODS AND SYSTEMS FOR INSTANTIATING AND TRANSPARENTLY MIGRATING EXECUTING CONTAINERIZED PROCESSES

CROSS-REFERENCE TO RELATED APPLICATIONS

This application is a continuation of U.S. application Ser. No. 17/403,326, filed on Aug. 16, 2021, entitled, "Methods and Systems for Instantiating and Transparently Migrating Executing Containerized Processes," which itself claims priority from U.S. Provisional Patent Application No. 63/066,566 filed on Aug. 17, 2020, entitled, "Methods and Systems for Instantiating and Transparently Migrating Executing Containerized Processes," and from U.S. Provisional Patent Application No. 63/211,200 filed on Jun. 16, 2021, entitled, "Methods and Systems for Instantiating and Transparently Migrating Executing Containerized Processes," each of which is hereby incorporated by reference.

BACKGROUND

The disclosure relates to methods for instantiating and migrating containerized processes. More particularly, the methods and systems described herein relate to functionality for instantiating and transparently migrating executing containerized processes.

There is a need for migrating executing processes. Conventionally, due to the many dependencies of an executing process to an underlying operating system, it is difficult, if not impossible, to migrate a process while the process executes. One conventional approach for addressing this need is to provide a virtual machine within which a process may execute and include in the virtual machine a virtualization of all hardware and software resources the process requires and then migrate the entire process. However, conventional approaches do not typically provide functionality for transparent migration of an executing process having less than all of the resources available within a virtual machine. Conventional container runtime processes may migrate conventional containerized processes (which have less than all of the resources available within the container, as they share an operating system kernel with other containerized processes) but that migration is not typically transparent or done "live" during execution of the containerized process, because the operating system kernel cannot be migrated and the operating system is deeply connected with other processes and so migration could not be done in a transparent manner.

BRIEF SUMMARY

A method for instantiating and transparently migrating executing containerized processes includes receiving, by a container engine executing on a first machine, an instruction to instantiate a container image on the first machine. The container engine transmits, to a modified container runtime process, executing on the first machine, the instruction to instantiate the container image on the first machine. The modified container runtime process generates, on the first machine, a shim process representing the instantiated container image. The shim process forwards the instruction to an agent executing on a second machine, via a proxy connected to the agent via a network connection. The agent directs instantiation of the container image as a containerized process. A scheduler component executing on the first machine determines to migrate the containerized process to a third machine. The scheduler component directs migration of the containerized process to the third machine, during execution of the containerized process.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The methods and systems described herein may provide functionality for instantiating and transparently migrating executing containerized processes during execution of the containerized process.

Figure 1A:
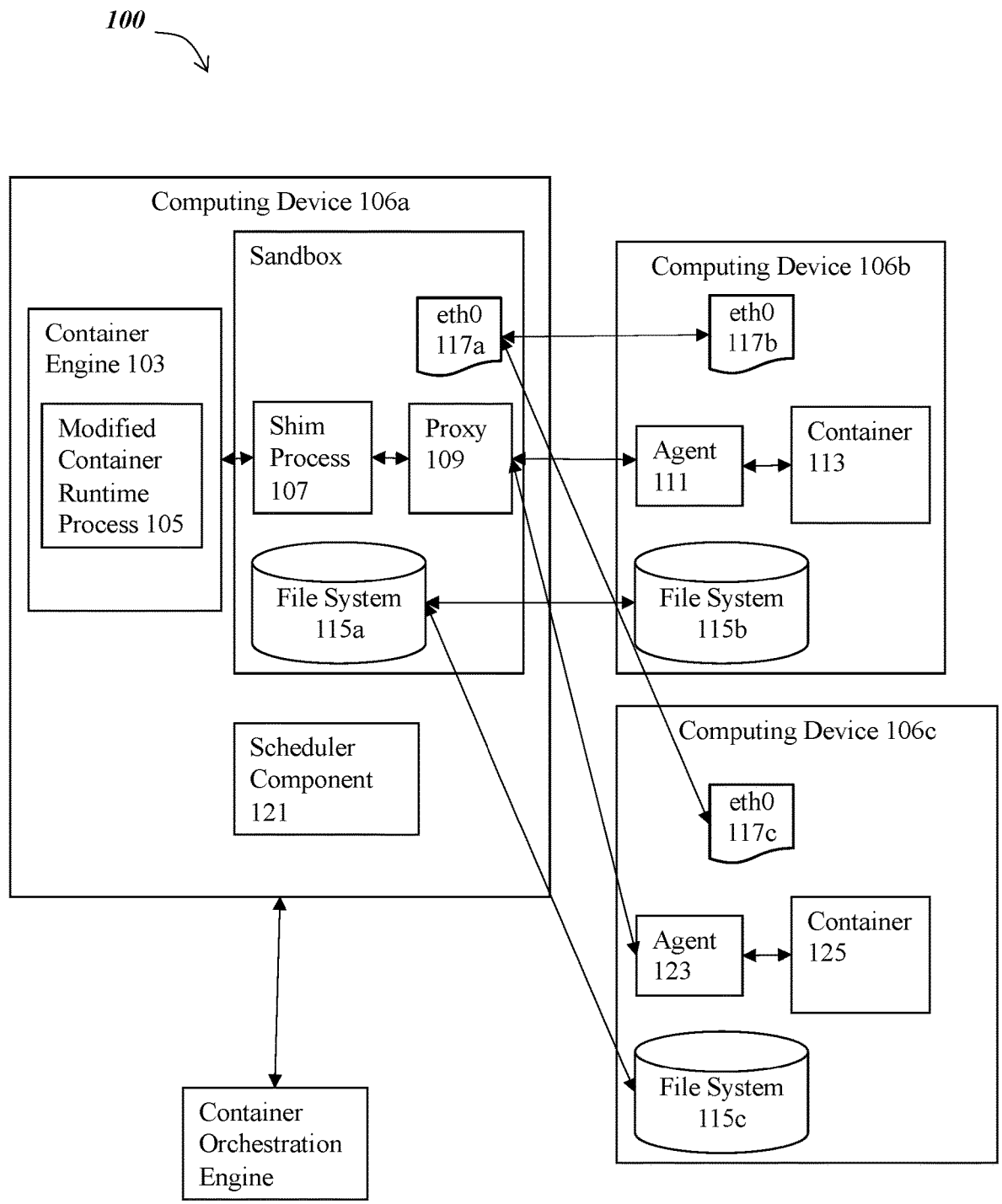
FIG. 1A is a Nock diagram depicting an embodiment of a system for instantiating and transparently migrating executing containerized processes.

Referring now to FIG. 1A, a Nock diagram depicts one embodiment of a system for instantiating and transparently migrating executing containerized processes. In brief overview, the system 100 includes a container engine 103, a modified container runtime process 105, a shim process 107, a proxy 109, an agent in, a container 113, a file system 115a, a file system 115b, a network port 117a, a network port 117b, a container orchestration engine 119, a scheduler component 121, a computing device 106a, a computing device 106b, and a computing device 106c.

The computing devices 106a-b (which may be referred to as computing devices, computes, machines, or computers) may be a modified type or form of computing device (as described in greater detail below in connection with FIGS. 3A-3C) that have been modified to execute instructions for providing the functionality described herein; these modifications result in a new type of computing device that provides a technical solution to problems rooted in computer technology, such as the ability to migrate processes during execution of those processes and, more specifically, the ability to instantiate and transparently migrate executing containerized processes from one computing device to another.

As will be understood by those of skill in the art, each of the machines 106a-c may be a physical machine or a virtual machine. As will be understood by those of skill in the art, the machine 106b may be a physical machine or a virtual machine.

The machine 106b may include functionality for instantiating a container image as a containerized process. As will be understood by those of skill in the art, conventional containers (and their associated container images) share a host computing device's kernel to run an application within the container; the conventional container typically includes only binaries, libraries, and runtime components—the isolation may be considered to be process-level isolation. Conventionally, therefore, containerized processes share access to an operating system kernel with other containerized processes executing on the same machine; however, this typically results in a security risk because a security vulnerability in one container can put all the other containers at risk. Some approaches to managing this risk include providing a shared "exokernel" that is extremely minimal and providing each container with a library that includes a private, container-specific operating system kernel, which is optimized for that particular container to include only the operating system resources needed by that container. Therefore, the methods and systems described herein provide functionality for instantiating and migrating executing containerized processes that include dedicated operating system kernels. The methods and systems described herein may provide functionality for supporting an operating system kernel that can be directly mapped into an address space of the containerized process. The methods and systems described herein may provide functionality for supporting an operating system kernel that can run separately in its own address space for isolation.

Each computing device 106 may run a sandbox. Any of the computing devices 106 may run more than one sandbox. Different sandboxes may have different network connections. Different sandboxes may have different file systems. Different sandboxes may have the same network connections. Different sandboxes may have the same file systems.

Each computing device 106 may run a virtual machine instead of or in addition to the sandbox.

Each computing device 106 may run a group or bundle of processes, two or more processes which execute together.

Each computing device 106 may execute a containerized process that is spawned with a dedicated operating system (OS) kernel. If the OS kernel is a kernel that is isolated from the containerized process, then the containerized process is a virtual machine; if the OS kernel is running as a library that is mapped to the address space of the process, such an OS kernel may be referred to as an "X-Container".

Figure 1B:
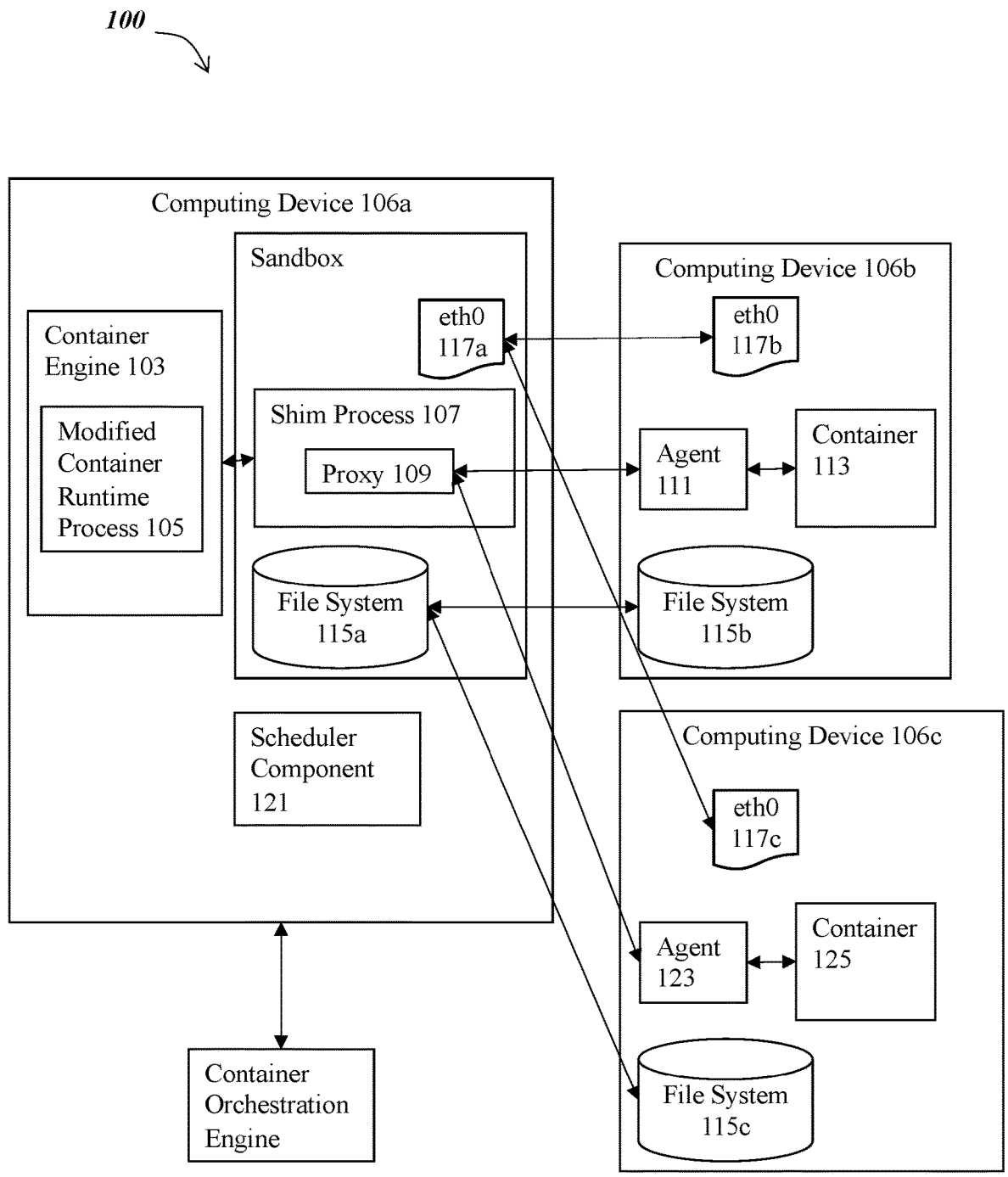
FIG. 1B is a Nock diagram depicting an embodiment of a system for instantiating and transparently migrating executing containerized processes.
Figure 1C:
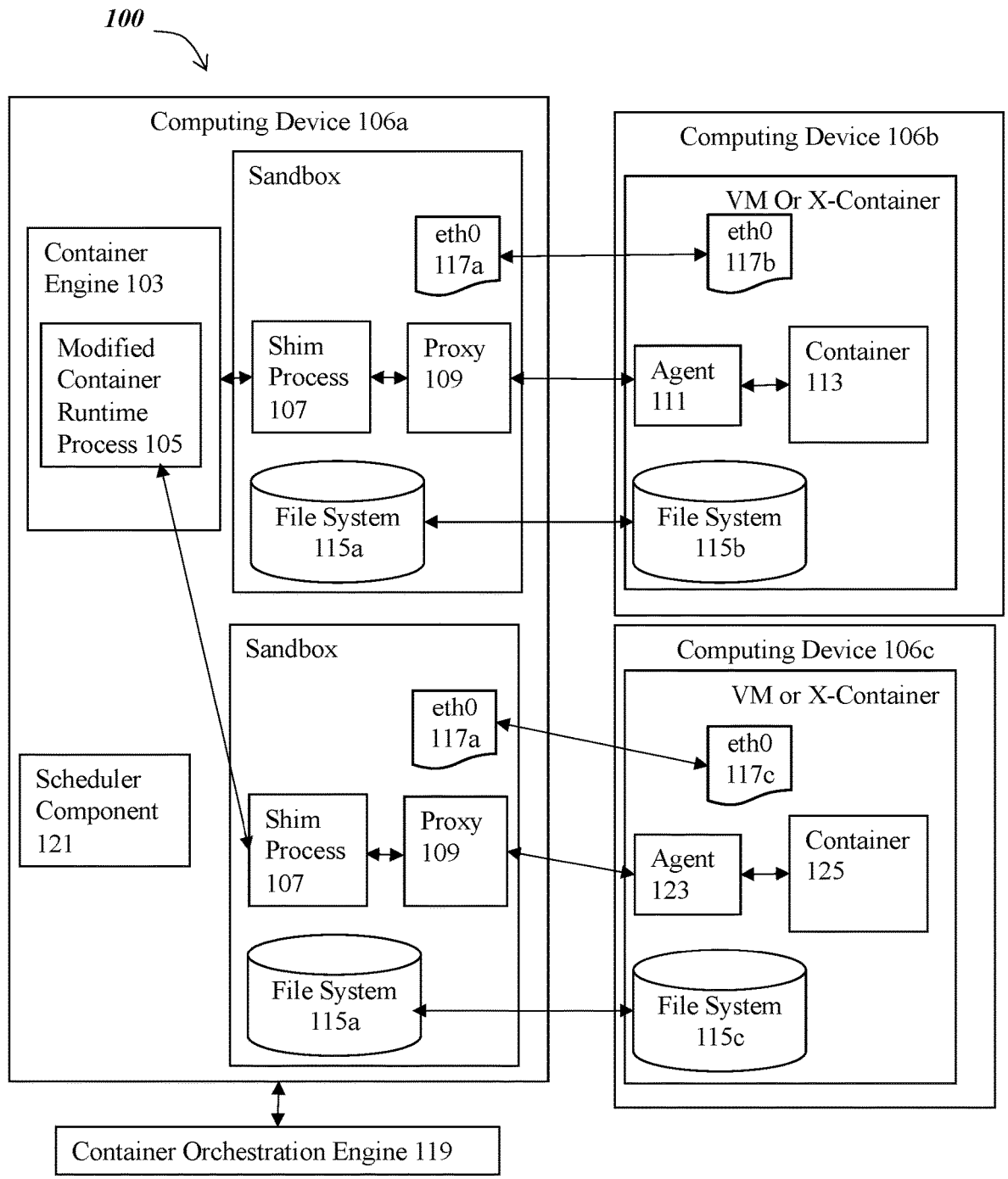
FIG. 1C is a Nock diagram depicting an embodiment of a system for instantiating and transparently migrating executing containerized processes.

Referring now to FIG. 1C, a Nock diagram depicts an embodiment of the system 100 in which an X-Container platform is installed on the computing device 106b and a second X-Container platform is installed on the computing device 106c, each of the X-Container platforms providing functionality for instantiating a container image as a containerized process. In some embodiments, the X-Container platforms provide functionality for migrating containerized processes from one machine to another. The X-Container platform may provide support for running an operating system kernel as a library. Although depicted in FIG. 1C as an X-Container platform, as understood by those of ordinary skill in the art and as described above, a virtual machine may be executed instead of the X-Container platform.

Referring back to FIG. 1A, in conjunction with FIGS. 1B and 1C, the container engine 103 may be provided as a software component. The container engine 103 may be provided as a hardware component. The computing device 106a may execute the container engine 103. The container engine 103 may provide functionality for receiving instructions to instantiate container images and directing the instantiation of the container image. The container engine 103 may provide functionality for receiving an instruction to execute the modified container process 105.

The container image may be a container image that includes a dedicated kernel. The container image may be a container image that includes a dedicated kernel executing as a library in user mode.

The system 100 may optionally include a container orchestration engine 119. The container orchestration engine 119 may execute on the computing device 106a. The container orchestration engine 119 may execute on a computing device 106d (not shown). The container engine 103 may be in communication with the container orchestration engine 119; for example, the container engine 103 may receive instructions for instantiating container images from the container orchestration engine 119.

The system 100 may include a scheduler component 121. The scheduler component 121 may execute on the computing device 106a. The scheduler component 121 may execute on a computing device 106d (not shown). The container engine 103 may be in communication with the scheduler component 121; for example, the container engine 103 may receive, from the container orchestration engine 119, instructions for migrating containerized processes from one computing device to another.

The modified container runtime process 105 may be provided as a software component. The modified container runtime process 105 may be provided as a hardware component. The computing device computing device 106a may execute the modified container runtime process 105. The container engine 103 may execute the modified container runtime process 105. The container engine 103 may include functionality for receiving instructions to execute the modified container runtime process 105. The container engine 103 may include functionality for receiving instructions to execute the modified container runtime process 105 instead of executing a conventional or otherwise unmodified container runtime process (not shown). The modified container runtime process 105 may be in communication with the shim process 107.

The modified container runtime 105 process includes functionality for receiving, from the container engine 103, the instruction to instantiate the container image on the first machine. The modified container runtime process 105 includes functionality for generating the shim process 107. The modified container runtime process 105 may include functionality for calling an Application Programming Interface (API) to generate the shim process 107.

The shim process 107 may be provided as a software component. The shim process 107 may be provided as a hardware component. The computing device computing device 106a may execute the shim process 107. The shim process 107 may provide a representation of the instantiated container images; for example, the shim process 107 may receive communications from components that intend to transmit data to the instantiated container image and that are unaware that the shim process 107 is not the instantiated container image. The shim process 107 may receive instructions from the container engine 103. Although one of ordinary skill in the art will understand that shim processes are conventionally placed between the container engine and the runtime process, the methods and systems described herein implement a shim process that provides for communication between the modified runtime process and the agent on the remote machine via the proxy 109, which may be a part of the shim process 107.

As will be understood by those of skill in the art, a sandbox typically encapsulates at least one container, storage resources associated with the at least one container, and a unique network identity—the sandbox may encapsulate an instance of at least one containerized application and at least one resource on which the at least one containerized application depends; however, as shown in FIG. 1A, the methods and systems described herein may provide functionality for connecting components within a sandbox with a container executing on a different machine 106b than the machine 106a hosting the sandbox.

The shim process 107 may connect with the agent 111 through the proxy 109. A worker daemon (not shown) executing on the machine 106b may be responsible for executing one or more commands sent by the modified container runtime 105 executing on the machine 106a. When the modified container runtime 105 creates a new sandbox on the machine 106a, the modified container runtime 105 spawns a shim process 107 that waits for a connection from an agent in. The modified container runtime 105 sends a command from the machine 106a to the worker daemon on the machine 106b, providing information including metadata about the configuration of the network, metadata about the configuration of the storage and information about how to connect an agent 111 to the shim process 107. The virtual machine executing on the machine 106b, connected on the internal management network to the machine 106a and able to receive messages from the machine 106a and the worker daemon, receives the metadata and executes the agent in. The agent 111 processes the metadata and, based on the processed metadata, establishes a network connection with the shim process 107 running on the machine 106a. Establishment of such a network connection between the shim process 107 and the agent 111 allows the agent in and the shim process 107 to communicate even if there is a migration of the containerized process and the associated agent 111 to a different machine 106n.

The proxy 109 may be provided as a software component. The proxy 109 may be provided as a hardware component. The computing device computing device 106a may execute the proxy 109. The proxy 109 may execute in a separate portion of the computing device 106a than the container engine 103; for example, the proxy 109 may execute within a sandbox on the computing device 106a. As shown in FIG. 113, the shim process 107 may execute the proxy 109 (e.g., the proxy 109 may be part of the shim process 107). Referring back to FIG. 1A, the shim process 107 may be in communication with the proxy 109. The proxy 109 includes functionality for communicating with the agent in, such as, for example and without limitation, instructions to migrate containerized processes from one computing device to another. The proxy 109 may include functionality for communicating with the agent 111 via a virtualized network. The virtualized network may support migration.

The agent 111 may be provided as a software component. The agent 111 may be provided as a hardware component. The computing device computing device 106b may execute the agent in. The agent 111 may be an agent executing within a virtual machine. The agent 111 includes functionality for communicating with the proxy 109 through a virtualized network that supports migration; for example, the agent 111 may include functionality for receiving instructions to instantiate a container image on the second computing device 106b. The agent 111 may include functionality for directing instantiation of the container image as a containerized process. The agent 111 includes functionality for communicating with the proxy 109. The agent 111 may, for example, include functionality for receiving instructions to migrate a containerized process from the computing device 106b to the computing device 106c (or to any other computing device). The agent 111 may include functionality for migrating the containerized process during execution of the containerized process to the third computing device 106c.

The container orchestration engine 119 may be provided as a software component. The container orchestration engine 119 may be provided as a hardware component. The computing device computing device 106a may execute the container orchestration engine 119. A computing device computing device 106d (not shown) may execute the container orchestration engine 119. The container orchestration engine 119 includes functionality for communicating with the container engine 103. The container orchestration engine 119 may be or include a container orchestration tool such as, without limitation, those provided by KUBERNETES, DOCKER SWARM, and APACHE MESOS.

The scheduler component 121 may be provided as a software component. The scheduler component 121 may be provided as a hardware component. The computing device computing device 106a may execute the scheduler component 121. A computing device computing device 106d (not shown) may execute the scheduler component 121. The scheduler component 121 includes functionality for communicating with the container engine 103. The scheduler component 121 may provide functionality for managing migrations. The scheduler component 121 may monitor a status of the system Dm. The scheduler component 121 may monitor one or more prices charged for the use of one or more virtual machines. The scheduler component 121 may trigger migration based on one or more policies. Policies may include, by way of example, policies for optimizing cost, minimizing latency, or increasing availability.

Although, for ease of discussion, the container engine 103, the modified container runtime process 105, the shim process 107, the proxy 109, the agent in, the container orchestration component 119, and the scheduler component 121 are described in FIG. 1 as separate modules, it should be understood that this does not restrict the architecture to a particular implementation. For instance, some or all of these components, in any combination, may be encompassed by a single circuit or software function or, alternatively, distributed across a plurality of computing devices.

Figure 2:
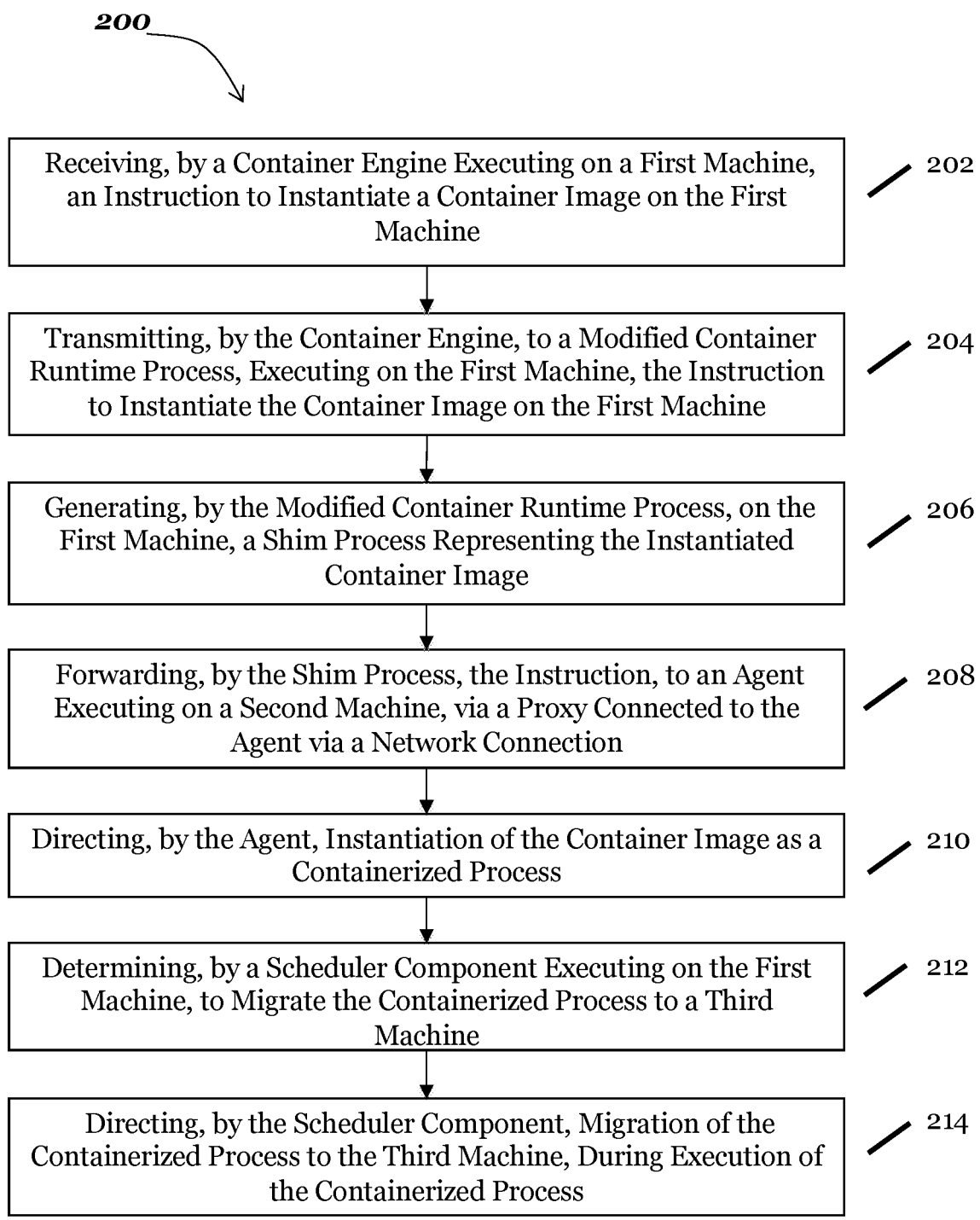
FIG. 2 is a flow diagram depicting an embodiment of a method for instantiating and transparently migrating executing containerized processes.

Referring now to FIG. 2, in brief overview, a flow diagram depicts one embodiment of a method 200 for instantiating and transparently migrating executing containerized processes. The method 200 includes receiving, by a container engine executing on a first machine, an instruction to instantiate a container image on the first machine (202). The method 200 includes transmitting, by the container engine, to a modified container runtime process, executing on the first machine, the instruction to instantiate the container image on the first machine (204). The method 200 includes generating, by the modified container runtime process, on the first machine, a shim process representing the instantiated container image (206). The method 200 includes forwarding, by the shim process, the instruction, to an agent executing on a second machine via a proxy connected to the agent via a network connection (208). The method 200 includes directing, by the agent executing on the second machine, instantiation of the container image as a containerized process (210). The method 200 includes determining, by a scheduler component executing on the first machine, to migrate the containerized process to a third machine (212). The method 200 includes directing, by the scheduler component, migration of the containerized process to the third machine, during execution of the containerized process (214).

Referring now to FIG. 2 in greater detail and in connection with FIG. 1, the method 200 includes receiving, by a container engine executing on a first machine, an instruction to instantiate a container image on the first machine, the container image including a dedicated kernel (202). The container engine 103 may receive the instruction from the container orchestration engine 119.

The method 200 includes transmitting, by the container engine, to a modified container runtime process, executing on the first machine, the instruction to instantiate the container image on the first machine (204). The modified container runtime process 105 may be configured to receive instructions to instantiate container images on the first machine but to first transmit the instruction to instantiate a container image to the scheduler component 121 to receive instructions as to an actual destination machine. The scheduler component 121 may then provide the modified container runtime process 105 with an instruction as to which machine to instantiate the container image on—for example, although the modified container runtime process 105 may receive an instruction from the container engine to instantiate the container image on the first machine 106a, the scheduler component 121 may instruct the modified container runtime process 105 to instantiate the container image on the second machine 106b (e.g., by providing an Internet Protocol (IP) address of a machine on which to instantiate the image); the modified container runtime process 105 is configured to execute the instructions of the scheduler component 121. The modified container process 105 communicates with a worker daemon executing on the machine identified by the scheduler component 121 to start the virtual machine on the identified machine, set up network and storage, and connect an agent 111 on the identified machine with the proxy 109 on the machine 106a. Should the scheduler component 121 subsequently determine to migrate the containerized process (including the agent 111 in the virtual machine of that containerized process), the scheduler component 121 will establish a new worker machine 106 with a new worker daemon (e.g., either establish a connection to an executing worker machine 106d, not shown, or direct the powering on and initialization of such a machine) and call the runtime process 105 to perform the actual migration.

The method 200 includes generating, by the modified container runtime process, on the first machine, a shim process representing the instantiated container image (206). Once instantiated, the shim process 107 may receive instructions directly from the container engine 103. The modified container runtime process 105 may transmit an instruction to the shim process 107 for connecting to the agent in. As an example, the modified container runtime process 105 may transmit an instruction to the shim process 107 to expect an incoming connection request from the agent in. The modified container runtime process 105 may transmit an instruction to the proxy 109 for connecting to the agent in. The modified container runtime process 105 may transmit an instruction to machine 106b to instruct initialize the agent 111 in a virtual machine in which the instantiated container image will run; such an instruction may include an instruction for the agent 111 to connect to the shim process 107 via the proxy 109 and may include connection information needed for the agent 111 to establish such a connection.

The modified container runtime process 105 may begin execution of the proxy 109. Alternatively, the shim process 107 begins execution of the proxy 109. The proxy 109 may be a component of the shim process 107 that begins executing when the shim process 107 begins executing. As described above, the proxy 109 may be a modified proxy that includes functionality for connecting to an agent 111 on a remote machine, in contrast to conventional proxies that may, at most, connect to an agent only if the agent executes on the same machine as the proxy. The methods and systems described herein provide for de-coupling of the proxy and the agent so that the proxy and the agent may communicate across a network connection. The modified container runtime process 105 may establish a network connection between a local file system 115a on the first computing device 106a and a remote file system 115b on the second computing device 106b; in this way, when the container 113 executes and makes a change to data within the file system 115b, the file system 115a has an up-to-date version of all the data modifications made by the container 113. Should the system 100 migrate the container 113 to a different machine (e.g., the third computing device 106c), the file system 115a retains the "true" or most up-to-date copy of all data accessed by the container 113. Similarly, the modified container runtime process 105 may establish a network connection between a network port on the computing device 106a and a network port on the computing device 106b and route instructions addressed to the network port 117b on the computing device 106b to the network port 117a on the computing device 106a.

The method 200 includes forwarding, by the shim process, the instruction, to an agent executing on a second machine via a proxy connected to the agent via a network connection (208). The modified container process 105 may have provided instructions for establishing of the network connection between the agent in and the proxy 109 upon executing the shim process 107. The establishment of a network between the VM in which the containerized process and the agent 111 executes (including the network port 117b and the file system 115b) and the shim process 107 on the computing device 106a may enable communication between each of the components even after migration of the virtual machine to a different machine 106 and allow for transparent migration of an executing process.

The method 200 includes directing, by the agent executing on the second machine, instantiation of the container image as a containerized process (210). In the event that the containerized process does not include a dedicated OS kernel, the system 100 may provide a default OS kernel.

The method 200 includes determining, by a scheduler component executing on the first machine, to migrate the containerized process to a third machine (212).

Figure 1D:
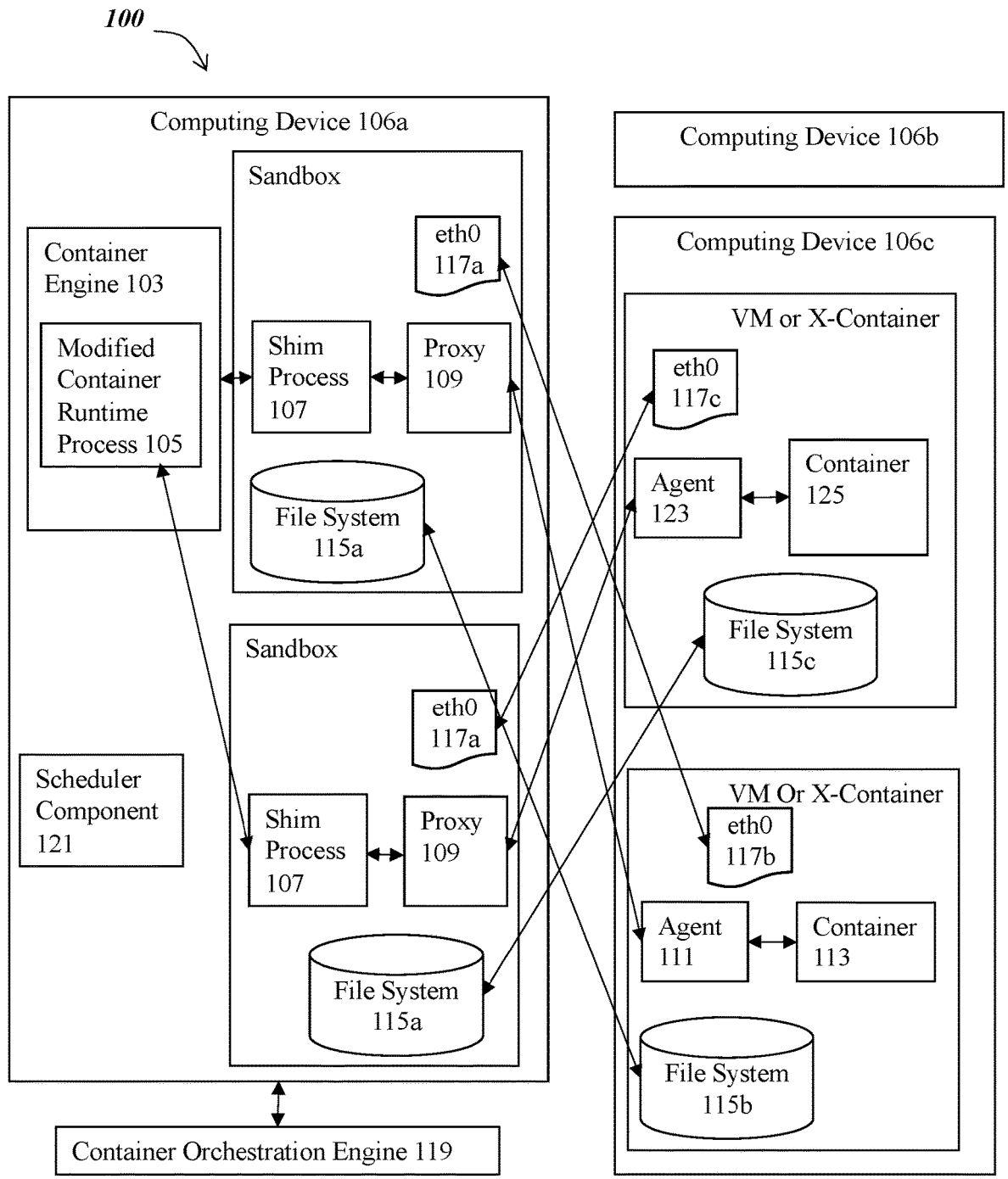
FIG. 1D is a Nock diagram depicting an embodiment of a system for instantiating and transparently migrating executing containerized processes.

The method 200 includes directing, by the scheduler component, migration of the containerized process to the third machine, during execution of the containerized process (216). Migration of the containerized process may include migration of the agent 111. Migration of the containerized process may include migration of the dedicated OS Kernel associated with the containerized process. In some embodiments, the computing device 106b and the computing device 106c each execute a virtual machine and the scheduler component 121 instructs the virtual machine on the computing device 106b to migrate the container 113 to the virtual machine on the computing device 106c. The scheduler component 121 may instruct the modified container runtime process 105 to conduct the migration process between the computing device 106b and the computing device 106c. The virtual machine on the computing device 106b may include functionality for migrating a containerized process to a virtual machine on another machine. Because the agent 111 within the same virtualized space as the containerized process is connected over a network with the shim process 107 and its proxy 109 on the machine 106a, the two components will be able to maintain communications even when the containerized process is moved to another machine 106c. When the virtual machine platform migrates the sandbox containing both the containerized process and the agent in, the virtual machine (now executing on the receiving machine 106c) reconfigures the network so that the connection between the agent in and the shim process 107 is transparently maintained. The containerized process has a dedicated OS kernel (whether or not run as a library), which migrates with the executing containerized process. The migration of the containerized process includes migration of the entire virtual machine within which the containerized process executes, including the dedicated OS kernel and the agent in. As shown in FIG. 1D, when the virtual machine migrates to the computing device 106c, the connections between the network, the file system, and the proxy on the computing device 106a persist and execution of the containerized process may continue substantially uninterrupted.

The methods and systems described herein therefore provide functionality for instantiating and migrating containerized processes while the containerized processes are still executing. As just one example of a scenario using this functionality, without limitation, the functionality may allow for "right sizing" or vertical scaling; starting with an instance of a container image having eight processor and two gigs of memory, the system 100 may transparently change the instance while the instance is running so that it now runs on a machine providing it with 8 processors and 100 gigs of memory—or, conversely, fewer resources if the instance does not require all of the resources available to it on the first machine on which it is instantiated. Therefore, the methods may include the steps of monitoring resource usage by a containerized process and identifying a machine that provides a more efficient use of resources. In such embodiments, the methods and systems described herein provide functionality for migrating when workload is low and eliminating the use of machines (physical or virtual) the users do not need. The scheduler component 121 may determine that the third computing device 106c, for example, provides functionality for hosting the containerized process at a level of efficiency that is higher than a level of efficiency provided by the second machine. The scheduler component 121 may determine that the third computing device 106c, for example, provides functionality for hosting the containerized process at a level of optimization that is higher than a level of optimization provided by the second machine. Threshold levels of efficiency and optimization may be specified by users.

In some embodiments, the scheduler component 121 may determine that an optimal machine for a particular containerized process is one where an owner of the machine charges a user less money for executing the containerized process on the optimal machine than on a different machine. For example, as those of ordinary skill in the art will understand, "spot markets" exist in which owners of one machine (physical or virtual) make a machine available at one price when there is a guarantee of availability of the machine and make the machine available at a lower price when there is no guarantee that the machine will remain available, which is typically only useful when the workload executed by the machine can tolerate being terminated at any point; in such embodiments, the methods and systems described herein may provide functionality for migrating when a machine that was previously available indicated it will no longer be available (possibly with little or no warning) and the migration of the containerized process can occur without stopping execution of the containerized process, making the spot market a viable option for more types of workloads. The methods and systems described herein may also provide functionality for migrating when a machine that was previously available at a first price is now available at a second price that is higher than the first price. The methods and systems described herein may also provide functionality for migrating from a first machine to a second machine when a second machine becomes available at a first price, which is lower than a price for using the first machine.

In some embodiments, the methods and systems described herein provide functionality for migrating containerized processes not just from one machine to a second machine where both machines are in the same network and/or owned or maintained by a single entity but across networks and from machines owned or maintained by a first entity to machines owned or maintained by a second entity (e.g., from one "cloud" to another). That is, the computing device 106b may reside in a different domain than a domain in which the computing device 106c resides; each entity may be managed by the same entity or by a different entity.

The methods and systems described herein may provide functionality for maintaining a replica (or "hot backup") of a container for high availability. The functionality for maintaining the container replica may execute transparently, instead of requiring a modification to the computing device providing the sandbox in which the container to be replicated executes. The scheduler component 121 may direct the generation of a replica of a container 113; for example, the scheduler component 121 may specify a schedule of times at which a replica of the executing container 113 should be generated. A computing device 106c may generate the replica container 125; for example, a daemon executing on the computing device 106c may generate the replica. Should the executing container 113 or the computing device 106b crash, unexpectedly terminate, or otherwise become unexpectedly unavailable, the method 200 may include executing the previously-generated replica container 125 of the now-unavailable container 113 in a way that is transparent to the container engine 103. By way of example, the proxy 109 may determine that the container 113 ceased execution (e.g., at a time when the container 125 was expected to continue executing); the proxy 109 may transmit an alert to the scheduler component 121. The scheduler component 121 may identify a previously-generated container replica 125 associated with the container 113 and direct execution of the replica. Container 125 starts execution with agent 123, which establishes a new connection with the proxy 109. Subsequent communications with the original container 113 will be switched to container 125. This switch happens transparently to the container engine 103 and other components communicating with the container.

Similarly, the methods and systems described herein may provide functionality for generating a checkpoint for a container (e.g., an "offline" version of the migration functionality described above). As will be understood by those of skill in the art, a checkpoint may capture a state of a container at a particular point in time and at a subsequent time the state of the container can be "rolled back" (e.g., changes can be undone) to match the state the container was in at the time of the generation of the checkpoint; a replica may be a backup of a container that is always up-to-date, capable of executing separately (e.g., instead of being a list of changes to make to put the container in the state it had in the past, the replica is a copy of the container that can execute independently of the original). In some embodiments, checkpoints are stored on disk (including, e.g., on an external storage device) and replicas are stored in memory. The functionality for generating the container checkpoint may execute transparently, instead of requiring a modification to the application itself or the container engine 103. The scheduler component 121 may direct the generation of a checkpoint of a container 113 (e.g., by the computing device on which the container 113 executes); for example, the scheduler component 121 may specify a schedule of times at which a checkpoint of the executing container 113 should be generated. By performing periodic, incremental checkpoints, the system ensures that a full checkpoint is available for execution even in the event that the checkpoint is needed with little or no advanced warning; for example, in the event of infrastructure failures, virtual machine crashes, and other failures, or when the user needs to roll back the system to a previous state for debugging or maintenance purposes. As described above in connection with the generation and execution of replicas, the scheduler component 121 may receive an alert indicating a problem with an executing container, identify a checkpoint associated with the executing container, and restore the checkpoint of the container to correct the problem.

In some embodiments, the system 100 includes non-transitory, computer-readable medium comprising computer program instructions tangibly stored on the non-transitory computer-readable medium, wherein the instructions are executable by at least one processor to perform each of the steps described above in connection with FIGS. 1A-D and 2.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The terms "A or B", "at least one of A or/and B", "at least one of A and B", "at least one of A or B", or "one or more of A or/and B" used in the various embodiments of the present disclosure include any and all combinations of words enumerated with it. For example, "A or B", "at least one of A and B" or "at least one of A or B" may mean (1) including at least one A, (2) including at least one B, (3) including either A or B, or (4) including both at least one A and at least one B.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C #, JAVA, Python, Rust, Go, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or grayscale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 3A:
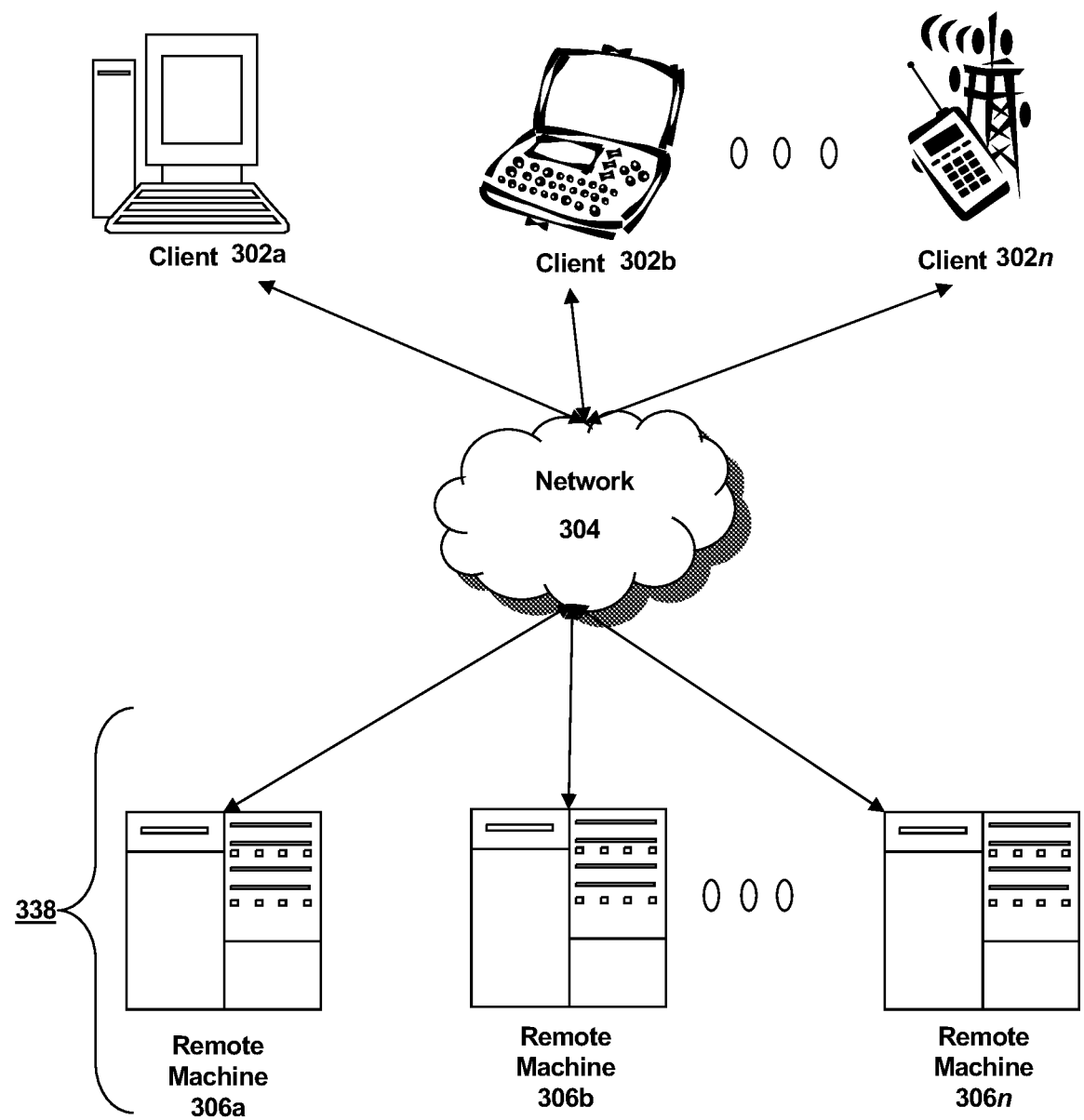
FIGS. 3A-3C are Nock diagrams depicting embodiments of computers useful in connection with the methods and systems described herein.
Figure 3B:
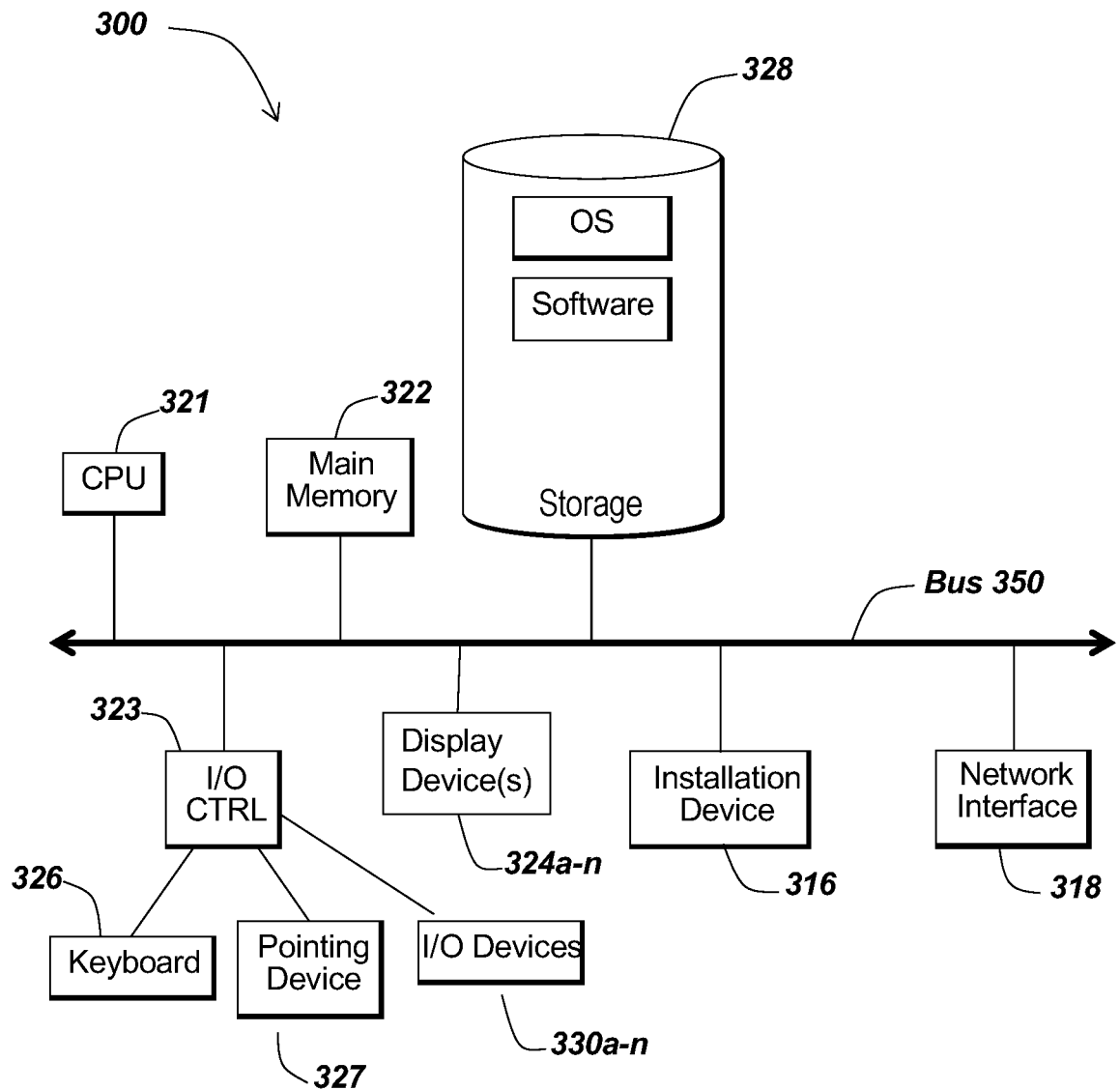
Figure 3C:
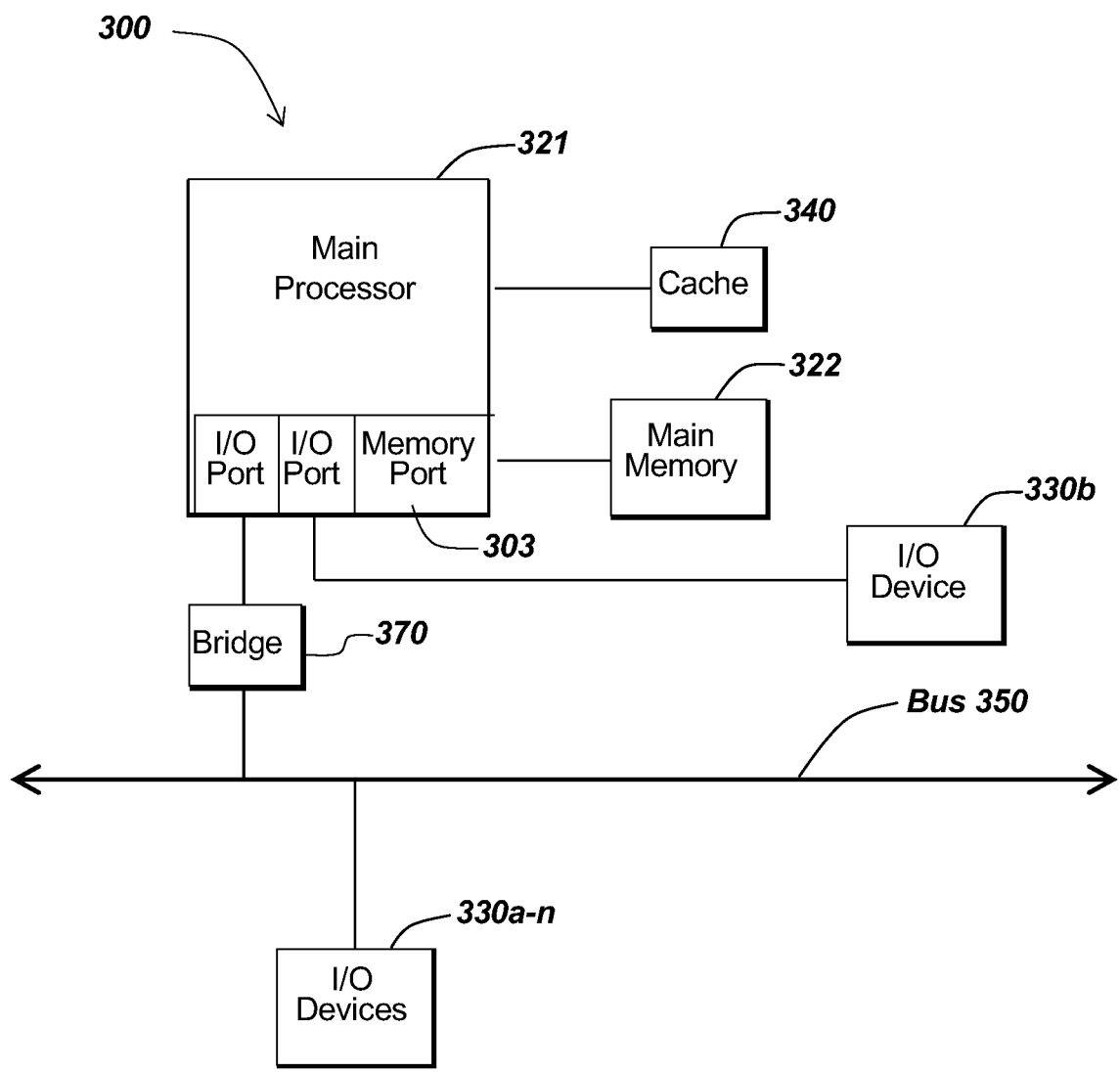

Referring now to FIGS. 3A, 3B, and 3C, Nock diagrams depict additional detail regarding computing devices that may be modified to execute novel, non-obvious functionality for implementing the methods and systems described above.

Referring now to FIG. 3A, an embodiment of a network environment is depicted. In brief overview, the network environment comprises one or more clients 302a-302n (also generally referred to as local machine(s) 302, client(s) 302, client node(s) 302, client machine(s) 302, client computer(s) 302, client device(s) 302, computing device(s) 302, endpoint(s) 302, or endpoint node(s) 302) in communication with one or more remote machines 306a-306n (also generally referred to as server(s) 306 or computing device(s) 306) via one or more networks 304.

Although FIG. 3A shows a network 304 between the clients 302 and the remote machines 306, the clients 302 and the remote machines 306 may be on the same network 304. The network 304 can be a local area network (LAN), such as a company Intranet, a metropolitan area network (MAN), or a wide area network (WAN), such as the Internet or the World Wide Web. In some embodiments, there are multiple networks 304 between the clients 302 and the remote machines 306. In one of these embodiments, a network 304' (not shown) may be a private network and a network 304 may be a public network. In another of these embodiments, a network 304 may be a private network and a network 304' a public network. In still another embodiment, networks 304 and 304' may both be private networks. In yet another embodiment, networks 304 and 304' may both be public networks.

The network 304 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, a wireline network, an Ethernet, a virtual private network (VPN), a software-defined network (SDN), a network within the cloud such as AWS VPC (Virtual Private Cloud) network or Azure Virtual Network (VNet), and a RDMA (Remote Direct Memory Access) network. In some embodiments, the network 304 may comprise a wireless link, such as an infrared channel or satellite band. The topology of the network 304 may be a bus, star, or ring network topology. The network 304 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 302 and a remote machine 306 (referred to generally as computing devices 300 or as machines 300) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 302 may execute, operate or otherwise provide an application, which can be any type and/or form of software, program, or executable instructions, including, without limitation, any type and/or form of web browser, web-based client, client-server application, an ActiveX control, a JAVA applet, a webserver, a database, an HPC (high performance computing) application, a data processing application, or any other type and/or form of executable instructions capable of executing on client 302.

In one embodiment, a computing device 306 provides functionality of a web server. The web server may be any type of web server, including web servers that are open-source web servers, web servers that execute proprietary software, and cloud-based web servers where a third party hosts the hardware executing the functionality of the web server. In some embodiments, a web server 306 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, WA, the ORACLE IPLANET web server products provided by Oracle Corporation of Redwood Shores, CA, or the ORACLE WEBLOGIC products provided by Oracle Corporation of Redwood Shores, CA.

In some embodiments, the system may include multiple, logically-grouped remote machines 306. In one of these embodiments, the logical group of remote machines may be referred to as a server farm 338. In another of these embodiments, the server farm 338 may be administered as a single entity.

As will be understood by those of skill in the art, in some embodiments, a computing device 300 may provide a virtualization environment. In such embodiments, the computing device 300 may include a hypervisor layer, a virtualization layer, and a hardware layer. The hypervisor layer includes a hypervisor that allocates and manages access to a number of physical resources in the hardware layer (e.g., the processor(s) and disk(s)) by at least one virtual machine executing in the virtualization layer. The virtualization layer includes at least one operating system and a plurality of virtual resources allocated to the at least one operating system. Virtual resources may include, without limitation, a plurality of virtual processors and virtual disks, as well as virtual resources such as virtual memory and virtual network interfaces. The plurality of virtual resources and the operating system may be referred to as a virtual machine. A hypervisor may provide virtual resources to an operating system in any manner that simulates the operating system having access to a physical device. A hypervisor may provide virtual resources to any number of guest operating systems. In some embodiments, a computing device executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, California; the XEN hypervisor, an open source product whose development is overseen by the open source Xen.org community; the KVM hypervisor, an open source product whose development is overseen by the open source Linux community; HyperV, VirtualServer or virtual PC hypervisors provided by Microsoft, Amazon Nitro, Amazon Firecracker, or others. In some embodiments, a computing device executing a hypervisor that creates a virtual machine platform on which guest operating systems may execute is referred to as a host server. In some embodiments, a hypervisor executes within an operating system executing on a computing device. In one of these embodiments, a computing device executing an operating system and a hypervisor may be said to have a host operating system (the operating system executing on the computing device), and a guest operating system (an operating system executing within a computing resource partition provided by the hypervisor). In other embodiments, a hypervisor interacts directly with hardware on a computing device, instead of executing on a host operating system. In one of these embodiments, the hypervisor may be said to be executing on "bare metal," referring to the hardware comprising the computing device. In some embodiments, the hypervisor controls processor scheduling and memory partitioning for a virtual machine executing on the computing device. In one of these embodiments, the hypervisor controls the execution of at least one virtual machine. In another of these embodiments, the hypervisor presents at least one virtual machine with an abstraction of at least one hardware resource provided by the computing device. In other embodiments, the hypervisor controls whether and how physical processor capabilities are presented to the virtual machine. In one embodiment, the guest operating system, in conjunction with the virtual machine on which it executes, forms a fully-virtualized virtual machine which is not aware that it is a virtual machine; such a machine may be referred to as a "Domain U HVM (Hardware Virtual Machine)". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor; in such an embodiment, the driver is typically aware that it executes within a virtualized environment. In another embodiment, the guest operating system, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include.

FIGS. 3B and 3C depict Nock diagrams of a computing device 400 useful for practicing an embodiment of the client 302 or a remote machine 306. As shown in FIGS. 3B and 3C, each computing device 300 includes a central processing unit 321, and a main memory unit 322. As shown in FIG. 3B, a computing device 300 may include a storage device 328, an installation device 316, a network interface 318, an I/O controller 323, display devices 324a-n, a keyboard 326, a pointing device 327, such as a mouse, and one or more other I/O devices 330a-n. The storage device 328 may include, without limitation, an operating system and software. As shown in FIG. 3C, each computing device 300 may also include additional optional elements, such as a memory port 303, a bridge 370, one or more input/output devices 330a-n (generally referred to using reference numeral 330), and a cache memory 340 in communication with the central processing unit 321.

The central processing unit 321 is any logic circuitry that responds to and processes instructions fetched from the main memory unit 322. In many embodiments, the central processing unit 321 is provided by a microprocessor unit, such as: those manufactured by Intel Corporation of Mountain View, CA; those manufactured by Motorola Corporation of Schaumburg, IL; those manufactured by Transmeta Corporation of Santa Clara, CA; those manufactured by International Business Machines of White Plains, NY; or those manufactured by Advanced Micro Devices of Sunnyvale, CA. Other examples include RISC-V processors, SPARC processors, ARM processors, processors used to build UNIX/LINUX "white" boxes, and processors for mobile devices. The computing device 300 may be based on any of these processors, or any other processor capable of operating as described herein.

Main memory unit 322 may be one or more memory chips capable of storing data and allowing any storage location to be directly accessed by the microprocessor 321. The main memory unit 322 may be based on any available memory chips capable of operating as described herein. In the embodiment shown in FIG. 3B, the processor 321 communicates with the main memory unit 322 via a system bus 350. FIG. 3C depicts an embodiment of a computing device 300 in which the processor communicates directly with the main memory unit 322 via a memory port 303. FIG. 3C also depicts an embodiment in which the main processor 321 communicates directly with cache memory 340 via a secondary bus, sometimes referred to as a backside bus. In other embodiments, the main processor 321 communicates with cache memory 340 using the system bus 350.

In the embodiment shown in FIG. 3B, the processor 321 communicates with various I/O devices 330 via a local system bus 350. Various buses may be used to connect the central processing unit 321 to any of the I/O devices 330, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display device 324, the processor 321 may use an Advanced Graphics Port (AGP) to communicate with the display device 324. FIG. 3C depicts an embodiment of a computing device 300 in which the main processor 321 also communicates directly with an I/O device 330b via, for example, HYPERTRANSPORT, RAPIDIO, or INFINIBAND communications technology.

One or more of a wide variety of I/O devices 330a-n may be present in or connected to the computing device 300, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 323 as shown in FIG. 3B. Furthermore, an I/O device may also provide storage and/or an installation medium 316 for the computing device 300. In some embodiments, the computing device 300 may provide USB connections (not shown) to receive handheld USB storage devices such as the USB Flash Drive line of devices manufactured by Twintech Industry, Inc. of Los Alamitos, CA.

Referring still to FIG. 3B, the computing device 400 may support any suitable installation device 316, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 300 may provide functionality for installing software over a network 304. The computing device 300 may further comprise a storage device, such as one or more hard disk drives or redundant arrays of independent disks, for storing an operating system and other software. Alternatively, the computing device 300 may rely on memory chips for storage instead of hard disks.

Furthermore, the computing device 300 may include a network interface 318 to interface to the network 304 through a variety of connections including, but not limited to, standard telephone lines, LAN or WAN links (e.g., 802.11, T1, T3, 56 kb, X.25, SNA, DECNET, RDMA), broadband connections (e.g., ISDN, Frame Relay, ATM, Gigabit Ethernet, Ethernet-over-SONET), wireless connections, virtual private network (VPN) connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 300 communicates with other computing devices 300' via any type and/or form of gateway or tunneling protocol such as GRE, VXLAN, IPIP, SIT, ip6tnl, VTI and VTI6, IP6GRE, FOU, GUE, GENEVE, ERSPAN, Secure Socket Layer (SSL) or Transport Layer Security (TLS). The network interface 318 may comprise a built-in network adapter, network interface card, PCMCIA network card, card bus network adapter, wireless network adapter, USB network adapter, modem, or any other device suitable for interfacing the computing device 300 to any type of network capable of communication and performing the operations described herein.

In further embodiments, an I/O device 330 may be a bridge between the system bus 350 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a Serial Plus bus, a SCI/LAMP bus, a Fibre Channel bus, or a Serial Attached small computer system interface bus.

A computing device 300 of the sort depicted in FIGS. 3B and 3C typically operates under the control of operating systems, which control scheduling of tasks and access to system resources. The computing device 300 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, WINDOWS VISTA, and WINDOWS 10 all of which are manufactured by Microsoft Corporation of Redmond, WA; MAC OS manufactured by Apple Inc. of Cupertino, CA; OS/2 manufactured by International Business Machines of Armonk, NY; Red Hat Enterprise Linux, a Linux-variant operating system distributed by Red Hat, Inc., of Raleigh, NC; Ubuntu, a freely-available operating system distributed by Canonical Ltd. of London, England; CentOS, a freely-available operating system distributed by the centos.org community; SUSE Linux, a freely-available operating system distributed by SUSE, or any type and/or form of a Unix operating system, among others.

Having described certain embodiments of methods and systems for instantiating and transparently migrating executing containerized processes, it will be apparent to one of skill in the art that other embodiments incorporating the concepts of the disclosure may be used.

What is claimed is:

1. A method for instantiating and transparently migrating executing containerized processes, the method comprising:
   receiving, by a container engine executing on a first machine, an instruction to instantiate a container image on the first machine;
   transmitting, by the container engine, to a modified container runtime process, executing on the first machine, the instruction to instantiate the container image on the first machine;
   generating, by the modified container runtime process, on the first machine, a shim process representing the instantiated container image;
   forwarding, by the shim process, the instruction, to an agent executing on a second machine, via a proxy connected to the agent via a network connection;
   directing, by the agent, instantiation of the container image as a containerized process;
   directing, by a scheduler component executing on the first machine, generation of a checkpoint capturing a state of the instantiation of the container image during execution of the instantiation of the container image;
   determining, by the scheduler component, to migrate the containerized process to a third machine;
   directing, by the scheduler component, migration of the containerized process to the third machine, during execution of the containerized process; and
   directing, by the scheduler component, application of the checkpoint to the migrated containerized process.

2. The method of claim 1, wherein receiving, by the container engine, the instruction to instantiate the container image on the first machine further comprises receiving, by the container engine, from a container orchestration engine executing on the first machine, the instruction to instantiate the container image on the first machine.

3. The method of claim 1, further comprising determining, by the scheduler component, that the third machine provides functionality for hosting the containerized process at a level of efficiency that is higher than a level of efficiency provided by the second machine.

4. The method of claim 1, further comprising determining, by the scheduler component, that the third machine provides functionality for hosting the containerized process at a level of optimization that is higher than a level of optimization provided by the second machine.

5. A system for instantiating and transparently migrating executing containerized processes comprising:
   a container engine executing on a first machine and receiving an instruction to instantiate a container image on the first machine;
   a modified container runtime process executing on the first machine and receiving, from the container engine, the instruction to instantiate the container image on the first machine;
   a shim process (i) representing the instantiated container image, (ii) generated on the first machine by the modified container runtime responsive to receiving, by the modified container runtime process, the instruction to instantiate the container image on the first machine, and (iii) executing a proxy; an agent (i) executing on a second machine, (ii) connected to the proxy on the first machine via a network connection, (iii) receiving, from the shim process via the proxy, an instruction to instantiate the container image on the second machine, and (iv) directing instantiation of the container image as a containerized process; and
   a scheduler component executing on the first machine, directing generation of a checkpoint capturing a state of the instantiation of the container image during execution of the instantiation of the container image, determining to migrate the containerized process to a third machine, directing migration of the containerized process to the third machine, during execution of the containerized process, and directing application of the checkpoint to the migrated containerized process.

6. The system of claim 5, wherein the first machine is a physical computing device.

7. The system of claim 5, wherein the first machine is a virtual computing device.

8. The system of claim 5, wherein the second machine is a physical computing device.

9. The system of claim 5, wherein the second machine is a virtual computing device.

10. The system of claim 5, wherein the container image includes a dedicated kernel.

11. The system of claim 5, wherein the container image includes a dedicated kernel executing as a library in user mode.

12. The system of claim 5, wherein the system further comprises a container orchestration engine.

13. The system of claim 12, wherein the container engine further comprises functionality for receiving, from the container orchestration engine, the instruction to instantiate a container image on the first machine.

14. The system of claim 5, wherein the container engine further comprises functionality for receiving an instruction to execute the modified container runtime process.

15. The system of claim 5, wherein the scheduler component determines that the third machine provides functionality for hosting the containerized process at a level of efficiency that is higher than a level of efficiency provided by the second machine.

16. The system of claim 5, wherein the scheduler component determines that the third machine provides functionality for hosting the containerized process at a level of optimization that is higher than a level of optimization provided by the second machine.

\* \* \* \* \*